Oct. 30, 1923.
W. R. RIPLEY
1,472,533
ICE CREAM DIPPER
Filed Oct. 25, 1922
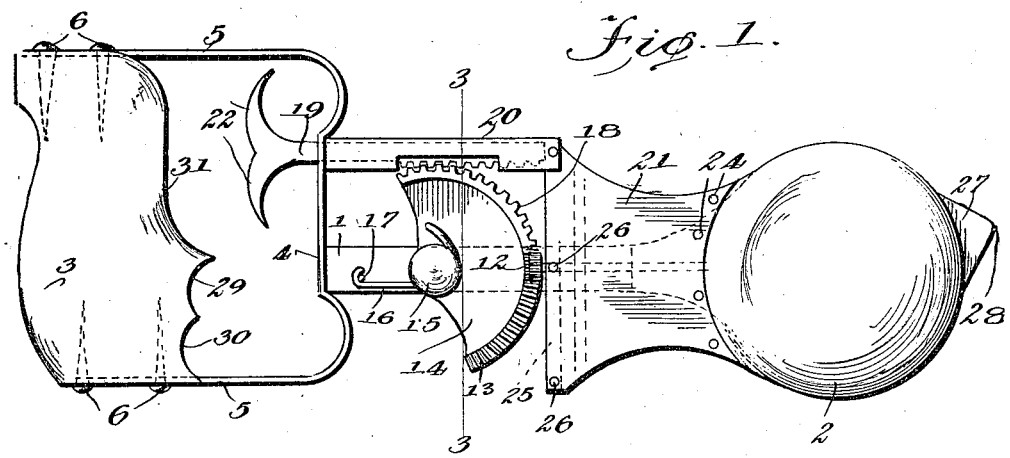
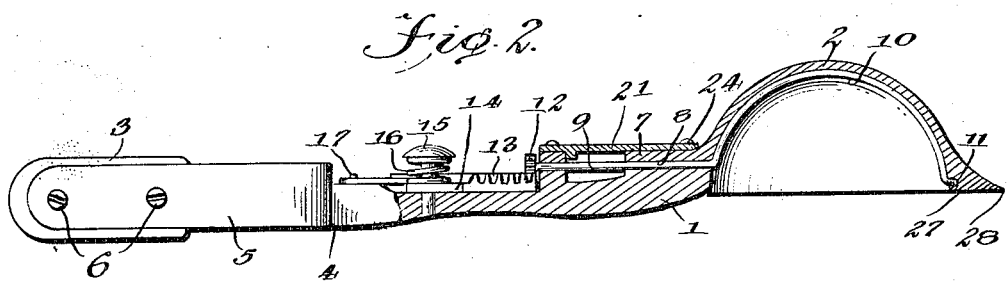
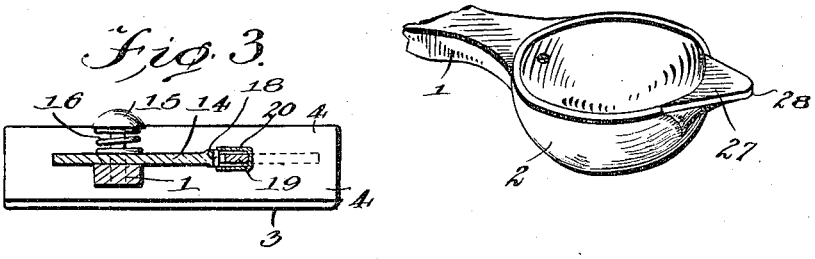
WITNESSES
INVENTOR
W. R. Ripley,
BY
ATTORNEYS Patented Oct. 30, 1923.

1,472,533

UNITED STATES PATENT OFFICE.

WILLIAM R. RIPLEY, OF TURLOCK, CALIFORNIA.

ICE-CREAM DIPPER.

Application filed October 25, 1922. Serial No. 596,839.

*To all whom it may concern:*

Be it known that I, WILLIAM R. RIPLEY, a citizen of the United States of America, residing at Turlock, in the county of Stanislaus and State of California, have invented certain new and useful Improvements in Ice-Cream Dippers, of which the following is a specification.

My invention is an improvement in ice cream dippers and it consists in the construction, combination and arrangements of parts herein described and claimed.

The object of my invention is to provide an ice cream dipper which requires but slight muscular exertion in the operation thereof to dispense ice cream or like substances.

A further object of my invention is to provide an ice cream dipper adapted by its shape to be conveniently and easily manipulated to dip and dispense portions from a mass of ice cream of like substance.

A further object of my invention is to provide a dipper of the character described which is provided with means for guiding the spoon or bowl portion of the device into a relatively compact or hard mass of frozen material.

A still further object of my invention is to provide in an ice dipper an improved means which is adapted to co-act with a bowl or spoon portion of the dipper to scrape ice cream or like substance from the bowl or spoon portion.

Other objects and advantages will be apparent from the following description, the novel features of the invention being particularly outlined in the appended claims.

My invention is illustrated by way of example in the accompanying drawings, forming part of this application, in which:

Figure 1 is a view in elevation of a dipper embodying the invention,

Figure 2 is a view taken at right angles to Figure 1, portions of the dipper being broken away and the other portions being shown in section, Figure 3 is a section taken along the line 3—3 of Fig. 1, and Figure 4 is a fragmental perspective view of the front end portion of the dipper.

In carrying out the invention I provide a longitudinal body 1 having at its one end a bowl or spoon 2 which is formed integrally therewith and is of the usual substantially hemispherical form. The body 1 is connected at its other or rearward end with a handle or grip 3 through the agency of an open frame 4 which is substantially U-shaped and has the web portion thereof secured to the rearward end of the body so that substantially parallel arm portions 5—5 of the frame extend in parallel relation to each other, and to the longitudinal axis of the body. The handle or grip 3 extends between the arms of the frame and is rigidly secured to the latter by screws 6 or the like, whereby portions of the handle or grip 3 will be disposed at opposite sides of the longitudinal axis of the body 1, and the axis of the handle or grip 3 would intersect at right angles the axis of the body 1 were the latter extended through the open frame.

The body 1 is enlarged laterally adjacent to its forward end and at its juncture with the bowl 2, as indicated at 7, and is provided with a bore 8 extending through the enlarged portion thereof in parallel relation to the longitudinal axis of the body. The bore 8 opens at one of its ends into the interior of the bowl or spoon 2 and is adapted to receive a rotatable shaft 9 which is provided at its forward end with a scraper 10 working in sliding contact with the inner wall of the spoon or bowl 2 and being bent to conform to the curvature of the latter. The scraper 10 and the shaft 9 may be formed integrally with each other and the scraper 10 may be pivotally supported at its end remote from the shaft in a socket or bearing 11 in the inner wall of the bowl or spoon 2 at a point diametrically opposite the bore 8. A spur gear 12 is carried at the rearward end of the shaft 9 and engages lateral teeth 13 provided on the one face of a segmental gear plate 14 adjacent to the outer edge of the latter. The segmental gear plate 14 is rotatably mounted upon a stub shaft or stud 15 extending laterally of the body 1 and is normally held in the position in which illustrated through the action of a torsion spring 16 having convolutions thereof encircling the stub shaft or stud and having one end secured to the segmental gear plate, while the other end thereof re-acts against a stud or projection 17 carried by the body 1 in adjacent relation to the stud 15. It will be observed at this point that the teeth 13 extend from the one end of the segmental gear plate approximately one-half the length of the arcuate outer edge of the gear plate and that a series of spur teeth 18 extend from the terminus of the series of teeth 13 to the other end of the gear plate.

The teeth 18 are continuously in mesh with the teeth of a slidable rack bar or actuator 19 which is guided and retained during its longitudinal movements by a guide frame 20 which is supported in parallel relation to the axis of the body 1 by the web portion of the open frame 4 and by a re-inforcing plate 21 with which the guide frame 20 is connected at its inner end. The rack bar or actuator projects within the open frame 4 and terminates therewithin in oppositely extending lateral projections 22—22, the inner faces of which are curved to provide finger holds for the index and second fingers of a hand grasping the grip or handle 3.

The reinforcing plate 21 heretofore mentioned extends laterally on opposite sides of the body 1 and may be attached to the latter and to the bowl or spoon 2 by rivets 24 or the like to effectively stay the bowl and the body to each other and to prevent any relative movement between these parts under stress. The reinforcing plate 21 may be strengthened at its rearward end by a bar 25 extending laterally of the body 1 and being secured to the latter by rivets or the like, as indicated at 26. Obviously, the bar 25 may be integral with the body and may, in fact, be omitted without weakening the construction appreciably. The strengthening or reinforcing plate 21 is so fashioned as to present smooth faces so that it may be cleaned readily and no recesses or depressions are provided in which dirt or foreign matter may lodge.

As is well known, considerable difficulty is ordinarily encountered in forcing the the bowl portion of a dipper of ordinary construction into a frozen mass of ice cream. My invention overcomes this deficiency by providing means for guiding the bowl or spoon portion of the dipper into the frozen mass and for facilitating the insertion of the bowl or spoon into the latter. Such means comprises a member which I term a pilot and which assumes the form of a substantially triangular lip 27 which may be formed integrally with the bowl or spoon portion 2 and which extends laterally of the open edge of the latter substantially in the plane of the open end of the bowl or spoon. The apex 28 of the lip is located slightly at one side of a line extending diametrically in the plane of the open end of the bowl or spoon 2 and in alignment with the longitudinal axis of the body 1.

From the foregoing description of the various parts of the device, the operation thereof may be readily understood. The inner face of the handle or grip 3 is fashioned at 29 and 30, respectively, to receive the third and fourth fingers of a hand grasping the grip or handle, the latter being suitably curved in cross sectional contour to be conveniently gripped and having the forward face thereof cut away, at 31, so as to permit free movement of the proximate end of the actuator or rack bar 19. The end portions of the web portion of the open frame are also curved forwardly to prevent binding of the fingers of the hand grasping the handle or grip 3 and manipulating the rack bar 19 in a manner to be now described.

The handle or grip having been grasped and the index and second finger being in engagement with the finger projections 22—22 on the rack bar 19, the bowl or spoon 2 is guided into a mass of ice cream or other frozen materials by the lip 27 which readily penetrates a compact and relatively hard mass because of the projection of the pointed sharp-edged apex or tip portion thereof. When the bowl or spoon 2 has been filled, the dipper is raised to dip the contents thereof from the frozen mass and the rack bar 19 is then pulled toward the handle 3. This effects a partial rotation of the segmental gear plate 14 and causes the scraper element 10 to move in sliding contact with the inner wall of the bowl or spoon, whereby the contents of the latter are ejected therefrom.

The device is capable of repeated use without any appreciable deterioration therein or wear on the parts thereof, since the construction is sufficiently strong and durable to withstand without strain the stress to which subjected in service. The shape of the improved dipper and the relative arrangement of parts are such as to permit of the application of a relatively great force to effect the insertion of the bowl or spoon into a frozen mass and the removal of quantities from the frozen mass with but slight muscular exertion being required.

Obviously my invention is susceptible of embodiment in forms other than that in which illustrated in the accompanying drawings and I, therefore, consider as my own all modifications and adaptations thereof which fairly fall within the scope of the appended claims.

I claim:

1. An ice cream dipper comprising a longitudinal body, a bowl at one end of the body, a handle connected to the body at its other end and extending at right angles in two directions to the longitudinal axis of the body, a scraper working within the bowl, a rack bar slidably supported upon the body and having a depending portion at its rearward end extending substantially parallel with the longitudinal axis of the handle and being spaced therefrom, and a gear and shaft element carried by the body between the rack bar and the scraper for operating the scraper when the rack bar is drawn axially toward the handle.

2. An ice cream dipper comprising a longitudinal body, a bowl at one end of the body, a handle connected to the body at its other end, a scraper working within the bowl, a rack bar slidably supported upon the body and having a depending portion at its rearward end extending substantially parallel with the longitudinal axis of the handle and being spaced therefrom, a gear and shaft element carried by the body between the rack bar and the scraper for operating the scraper when the rack bar is drawn axially toward the handle, and spring means co-acting with said shaft and gear element to return the scraper to the position from which moved by actuation of the rack bar when pressure is removed from the rack bar.

3. In an ice cream dipper, a longitudinal body provided with a bowl at one end thereof, and a lip on the bowl having a sharp-edged pointed tip, said lip being merged into the bowl at the edge of the latter and extending laterally of the bowl substantially in the plane of the open end of the latter.

4. In an ice cream dipper, a longitudinal body provided with a bowl at one end thereof, said bowl being substantially hemispherical in form, and a guide lip extending laterally of the bowl at the edge of the latter and being positioned with the tip thereof terminating slightly at one side of a line extending diametrically across the bowl in alignment with the longitudinal axis of the body.

5. In an ice cream dipper, a longitudinal body provided with a bowl at one end thereof, an open frame having the web portion thereof secured to the other end of said body and having parallel rearwardly extending spaced-apart arms, a handle extending between said arms and being secured thereto, a scraper working in the bowl, means for actuating the scraper including a slidable rack bar extending into the open frame and being spring-pressed toward the bowl, said rack bar having at its rearward end a pair of oppositely extending finger-engaging portions, means for guiding the rack bar in its lengthwise movements, and re-inforcing means connecting the bowl, the body and the rack bar guiding means together and staying these parts against relative movement.

WILLIAM R. RIPLEY.